United States Patent Office 2,984,685
Patented May 16, 1961

2,984,685

DIPHENOLIC ACID HYDRAZINE

Reynold E. Holmen, White Bear Lake, Minn., assignor to Minnesota Mining & Manufacturing Company, St. Paul, Minn., a corporation of Delaware No Drawing. Original application Apr. 20, 1955, Ser. No. 502,742. Divided and this application Nov. 25, 1960, Ser. No. 71,444

2 Claims. (Cl. 260—559)

This application is a division of my copending patent application S.N. 502,742, filed April 20, 1955.

This invention relates to a new and highly useful class of bisphenol compounds containing phenolic radicals and additional functional groups providing for increased reactivity and other valuable properties. The invention also relates to novel resinous and other products prepared from such compounds, and to methods of making the compounds and products. More particularly, the invention relates to a class of bisphenol compounds having a radical containing a carbonyl group and in which the carbonyl carbon atom and the connecting carbon atom of the bisphenol group are joined by an alkylene radical of at least two carbon atoms, i.e. a polymethylene or alkyl-substituted polymethylene radical. A specific novel compound of particular interest and conforming to the requirements thus set forth is gamma,gamma-bis(4-hydroxyphenyl)valeric acid.

Acid-catalyzed reaction between phenols and ketones to produce bisphenolic substituted reaction products is shown in various U.S. Patents, e.g. Nos. 1,986,423— 2,182,308 — 2,191,831 — 2,359,242—2,468,982—2,602,-822 and 2,669,588. The reaction proceeds easily with phenols such as monohydroxy benzene, o-cresol, 2,6-diisopropyl phenol and alpha-naphthol. The reaction is inhibited to a greater or lesser degree in the case of certain substituted phenols such as 3,5-xylenol because of steric hindrance, or o-chlorophenol or o-nitrophenol because of deactivation of the aromatic ring. Beta-naphthol is known to be less readily reactive than is alpha-naphthol.

The prior art also provides alternative methods for the preparation of such bisphenolic substituted products. For example, acid-catalyzed reaction between a phenol and an unsaturated organic halide or a substituted aromatic organoperoxide has been shown to provide reaction products having a bisphenol structure.

None of these prior art disclosures provides a compound having both a bisphenol grouping and a carboxylic acid radical, or equivalent reactive carbonyl-containing radical, in which the two are connected by an alkylene radical of at least two carbon atoms, and having the properties of high internal stability and high degree of reactivity inherent in the novel products of the present invention.

The compounds of the present invention are easily produced in good yield and without wasteful formation of large quantities of undesirable by-products. Many of these compounds may be obtained in substantially pure crystalline form. The acidic compounds are highly reactive and easily esterified, and simple esters are easily re-esterified by ester interchange. The presence of at least two carbon atoms in the alkylene chain separating the keto group and the carbonyl-containing radical makes possible the formation of esters of high complexity without steric hindrance.

Compounds of the type herein contemplated are readily produced by reaction, in the presence of a mineral acid catalyst, between (1) a phenol and (2) an oxocarboxylic or keto acid or ester in which a keto group is connected to a carboxy or carboalkoxy radical through an alkylene radical of at least two carbon atoms. Such keto compounds are readily available and are highly stable both under acid conditions and at elevated temperature whether in the form of the carboxylic acid or the ester. Levulinic acid is a preferred example and, since this compound is readily available, it or its alkyl esters is employed in the exemplary but non-limitative formulas and procedures hereinbelow set forth. Levulinic acid is obtained from the action of hydrochloric acid and heat on a variety of hexoses. Hydroxymethylfurfural is an intermediate which has been described as going through the following steps to levulinic acid:

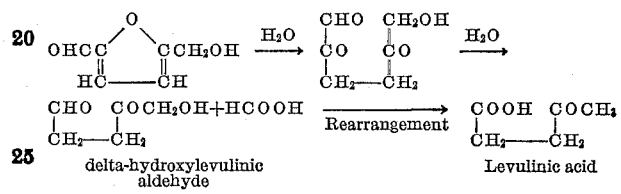

delta-hydroxylevulinic aldehyde

Levulinic acid

Levulinic acid is a gamma-keto acid, i.e. the alkylene radical connecting the keto group and the carboxyl group is an ethylene radical. It is found that at least two carbon atoms are necessary in the connecting carbon chain in order to obtain the desired high rate of reactivity between the keto acid and the phenol. Furthermore the bisphenol compounds thus obtained are readily reactive at the carboxyl radical with alcohols or other acid-reactive compounds of a high degree of molecular complexity.

The intermediate alkylene radical may be either a polymethylene radical such as a propylene or preferably an ethylene radical, or may be an alkyl-substituted polymethylene radical such as an ethyl ethylene radical. Compounds of the latter type, viz., alpha-alkyl-gamma-oxocarboxylic acids, are readily prepared from alpha-halogen aliphatic acids and sodium acetoacetic esters or acetylacetonates.

As indicated in the formula, levulinic acid has a 5-carbon-atom skeletal chain, and thus has a terminal methyl group attached to the keto carbon atom. Analogous keto acids in which other hydrocarbon radicals replace the terminal methyl group of levulinic acid are known and are contemplated for use in the preparation of novel bisphenol acids and derivatives in accordance with the principles of this invention. Licanic acid obtained from oiticica oil, or preferably the corresponding saturated gamma-keto acid, is one example of such a material.

The following examples are given for purposes of illustrating the invention and should not be considered as limitative in any respect. Examples I through X deal primarily with the preparation of a number of the novel compounds while the balance of the examples illustrate various applications thereof. In each case, the novel compounds have been prepared by the condensation of a phenol with a keto acid or ester, but it is anticipated that a variety of preparations are available. For instance, the teachings of the above-mentioned U.S. Patents 2,602,822 and 2,669,588 regarding alternative processes for obtaining bisphenol substituted alkanes may be applicable to the production of the compounds of this invention.

EXAMPLE IA

*γ,γ-Bis(4-hydroxyphenyl)valeric acid*

| | |
|---|---|
| Phenol | 18.8 g. (0.2 mol). |
| Levulinic acid | 5.8 g. (0.05 mol). |
| Calcium chloride | 7.0 g. |
| Conc. hydrochloric acid | 0.17 g. |
| Mercaptoacetic acid | 0.06 g. |

The phenol was dissolved in the levulinic acid to which was added the calcium chloride, hydrochloric acid and mercaptoacetic acid. Solution was hastened by slight warming. After ten days at room temperature, the viscous reaction mixture was poured into water, dissolved in ether and extracted with dilute aqueous sodium bicarbonate. Acidification of the combined bicarbonate extracts yielded a viscous water insoluble resin. This was dissolved in ether; some ethanol and benzene were added; and the solution was evaporated to dryness in a current of air, with heating. The pale amber solid resinous product was identified as γ,γ-bis(4-hydroxyphenyl)valeric acid having the following formula:

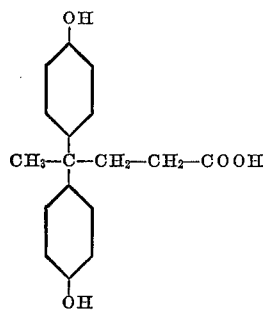

*Analysis.*—Calculated for $C_{17}H_{18}O_4$: C, 71.3; H, 6.3. Found: C, 71.1; H, 6.4.

The glassy form of this compound melts under 100° C., but, from solution, crystalline forms can be obtained either with solvent of crystallization or without, the solvated forms usually being obtained at room temperature. The solvated forms, when heated rapidly melted considerably lower than the anhydrous form which melted at 173–174° C. By slow cautious heating of the solvated forms, it was often possible to drive off the solvent at a lower temperature without concurrent melting. Crystals deposited from solution in a mixed solvent such as ethyl acetate-carbon tetrachloride often exhibited two unsharp melting points, each followed by resolidification.

It should be noted that a considerable excess of phenol was used, mostly because of the favorable effect on the reaction and the ease with which phenol can be removed from the condensation product. However, it is unnecessary that the phenol be present in excess; and, in fact, an excess of the levulinic acid could be used, if preferred.

Considerable latitude is permissible in the composition of the mixture from which γ,γ-bis(hydroxyphenyl)valeric acid is obtained, both as to choice of reactive agents and as to amounts. For instance, the following mixture and procedure resulted in a product identical to that obtained in following the foregoing recipe.

EXAMPLE IB

| | |
|---|---|
| Phenol | 94 g. |
| Levulinic acid | 46 g. |
| Mercaptoacetic acid | 1 g. |
| Toluene | 10 g. |
| Carbon tetrachloride | 5 g. |
| Dry hydrochloric acid | To saturate |

After a week at room temperature, the reaction mixture had attained the consistency of a crystalline mush. This was diluted with 70 ml. toluene and 2½ ml. ethyl acetate, then stirred. The γ,γ-bis(4-hydroxyphenyl)-valeric acid was collected on a filter as a cream-colored powdery solid weighing 85 grams.

The condensation of phenols with levulinic acid to give the γ,γ-bisphenolic substituted valeric acids of this invention was also carried out using as catalyst aqueous hydrochloric acid of concentrations varying from 37% (ordinary concentrated hydrochloric acid) down to about 8%. In these instances the quantities of concentrated hydrochloric acid used in the reaction mixture approximated the weight of levulinic acid used, and the reactions were run at reflux temperature (about 93–108° C.) for 20–24 hour periods.

Alternatively, sulfuric acid catalyst (of 80% or lower concentration) was also employed at room temperature. Shorter reaction times are often possible with sulfuric acid, but hydrochloric acid is more conveniently removed after completion of the reaction.

EXAMPLE II

*γ,γ-Bis(4-hydroxy-3-methylphenyl)valeric acid*

To freshly distilled o-cresol (216.3 grams) was added 58 grams levulinic acid and 2 grams mercaptoacetic acid. The solution was stirred and saturated with dry hydrochloric acid intermittently for two days and allowed to stand at room temperature for a total of seven days. Unreacted starting materials, water and the hydrochloric acid were distilled off under vacuum up to 150° C. at 2 mm. Hg. A residue weighing about 136 grams remained. To the hot residue was added, with stirring, about 100 ml. of xylene and 30 ml. of ethyl acetate. A fine mush separated as the mixture cooled. A first crop of 61 grams of pale powdery product (M.P. 143–145° C.) was collected on a filter (washed with xylene-ethyl acetate, 20:6 by volume). The filtrate was extracted with aqueous sodium bicarbonate and from this extract an additional 47 grams of product was recovered. A sample, recrystallized from methanol-water and dried to 130° C. in a vacuum, was analyzed and found to be γ,γ-bis(4-hydroxy-3-methylphenyl)valeric acid. The melting point of the sample was 144–146° C.

*Analysis.*—Calculated for $C_{19}H_{22}O_4$: C, 72.6; H, 7.0. Found: C, 72.4; H, 7.1.

This compound also readily forms lower melting crystals with solvent of crystallization.

Mercaptoacetic acid is one of a number of sulfur compounds which may be utilized to speed up the reaction of a phenol with the oxocarboxylic acids of this invention. Other compounds with which it may be replaced include hydrogen sulfide and mercaptopropionic acid. In fact, the reaction will proceed without the use of auxiliary catalysts but at a slower rate.

EXAMPLE III

*Ethyl ester of γ,γ-bis (4-hydroxyphenyl)valeric acid*

A solution of ethyl levulinate (36.05 grams), phenol (94 grams) and mercaptoacetic acid (5 drops) in absolute ethanol (46 grams) was saturated with dry hydrochloric acid. After this had stood about 36 hours at room temperature, a 7.5 gram sample was withdrawn and distilled under vacuum up to a bath temperature of 150° C. at 0.3 mm. Hg. The solid residue was dissolved in ethanol. Some water was added and the solvent slowly evaporated from the solution. The ethyl ester of γ,γ-bis-(4-hydroxyphenyl)valeric acid crystallized in stubby colorless prisms (M.P. 126–128° C.). Similar treatment of the balance of the reaction mixture several days after resaturating with dry hydrochloric acid gave a total yield of 30 grams more of the ethyl ester. Another sample was crystallized from ethyl acetate-petroleum ether and melted at 127.5–128.5° C.

*Analysis.*—Calculated for $C_{19}H_{22}O_4$, C, 72.6; H, 7.0. Found: C, 72.4; H, 7.1.

The esters of these bisphenolic substituted derivatives of valeric acid may either be prepared directly from the levulinic ester as described in this example, or the condensation product of the phenol and levulinic acid may be subsequently esterified as illustrated by the following two examples.

EXAMPLE IV

*Methyl ester of γ,γ-bis(4-hydroxyphenyl)valeric acid*

A solution of 20 grams of the product of Example I, that is, γ,γ-bis(4-hydroxyphenyl)valeric acid, in 50 ml. of methanol and 1 ml. concentrated sulfuric acid was refluxed for 3 hours and 15 minutes. Most of the methanol was removed under vacuum. The crude product residue was dissolved in ether, washed with dilute aqueous sodium bicarbonate, then washed with water, and dried over anhydrous magnesium sulfate. Evaporation of the solvent left 17 grams of resin. A sample, crystallized from solution in ethyl acetate-carbon tetrachloride, melted at about 85° C. with evolution of solvent of crystallization. Another solvated form was obtained from a methanol-water solution and melted unsharply at about 85°. A sample of the ester, recrystallized after evaporative distillation at 220–230° at 0.5 mm. Hg, was dried slowly under vacuum up to 95° C. until rid of solvent. Its melting point was found to be 130–132° C.

*Analysis.*—Calculated for $C_{18}H_{20}O_4$: C, 72.0; H, 6.7. Found: C, 71.6; H, 6.8.

EXAMPLE V

*Methyl ester of γ,γ-bis(4-hydroxy-3-methylphenyl) valeric acid*

This compound was prepared by the esterification of the product acid of Example II with methanol in a manner similar to that described in Example IV. The methyl ester of γ,γ-bis(4-hydroxy-3-methylphenyl)valeric acid was obtained as colorless crystals from a methanol-water solution. The compound melted at 130–132° C. The melting point was sharply depressed by admixture of this compound with that of Example IV.

*Analysis.*—Calculated for $C_{20}H_{24}O_4$: C, 73.2; H, 7.4. Found: C, 72.5; H, 7.4.

EXAMPLE VI

*γ,γ-Bis(3,5-diisopropyl-4-hydroxyphenyl)valeric acid*

To 62.5 grams (0.35 mols) of 2,6-diisopropylphenol and 23 grams (0.2 mols) of levulinic acid in a round bottomed flask was added 0.5 grams of mercaptoacetic acid and enough dry hydrochloric acid to saturate the solution. The charge was allowed to stand at room temperature for about six days, during which time it was resaturated with dry hydrochloric acid about once a day. A 4.5 gram sample was withdrawn and distilled up to 150° C. at 1 mm. Hg, yielding a residue of 0.6 grams of the desired product. After an additional week the product began to precipitate from the main reaction mixture in the form of fine silky needles. A first crop of 17 gram product was collected on a filter. This could be recrystallized from methanol-water, from ethylacetate-petroleum ether or from heptane. The colorless crystals melted at 131–132.5° C.

*Analysis.*—Calculated for $C_{29}H_{42}O_4$: C, 76.7; H, 9.3. Found: C, 76.6; H, 9.3.

The same compound was obtained in shorter time, also at room temperature, using 80% sulfuric acid as catalyst and a trace of stearylamine as emulsifier.

This compound proved to be an effective antioxidant for en elastomer based on butadiene.

EXAMPLE VII

*Condensation product of resorcinol and levulinic acid*

To 23.2 grams of levulinic acid and 22 grams of resorcinol dissolved in 10 grams of acetic acid was added 0.5 grams of mercaptoacetic acid and 0.5 ml. of concentrated hydrochloric acid. The reaction mixture was then saturated with dry hydrogen chloride and allowed to stand at room temperature. After an overnight period the viscosity of the reaction mixture had increased greatly. This viscous glassy product was diluted somewhat with ethyl acetate after which an excess of 37% aqueous formaldehyde was added. An exothermic reaction (catalyzed by the hydrochloric acid present) soon set in and the mass set up to a firm gel. The curing was continued at 125° C. until a hard fractured glass was obtained. This was broken up to about 4–10 mesh. The ion exchange capacity of this cross-linked polymer was measured using 0.1 N sodium hydroxide and found to be 4.2 milli-equivalents/gram.

Because of the tendency for resorcinol to react at more than one position on the ring, the product of the reaction between resorcinol and levulinic acid is not so simply defined as were the products of the foregoing examples derived from monohydric phenols. For example, it is probable that at least some of the resorcinol-levulinic acid reaction product has the following formula:

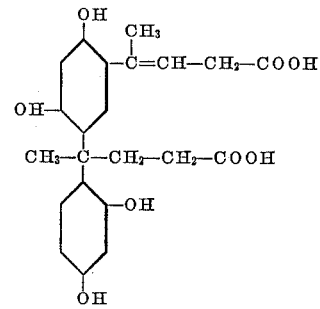

Some of the product may contain another resorcinol ring attached to the carbonyl carbon atom of the levulinic acid residue containing the ethylenic unsaturation, and additionally, in some molecules of the product, levulinic acid residues may be linked to both phenolic rings so that linear polymeric chains of considerable length may be possible.

Levulinic acid and its analogs may also react with polynuclear phenolic compounds as will be illustrated in the following example.

EXAMPLE VIII

*9-methyl-3,4,5,6-dibenzoxanthene-9-propionic acid*

A solution of alpha-naphthol (14.4 grams), levulinic acid (5.8 grams), and mercaptoacetic acid (0.5 gram) in glacial acid (10 ml.) was saturated with dry hydrochloric acid. After standing about a week at room temperature the reaction mixture was filtered, leaving 8.5 grams of colorless crystalline product. After vacuum drying at 150° C. and 1 mm. Hg pressure, the crystals melted at 244° C. with some prior sintering. The product is thought to have the following structure:

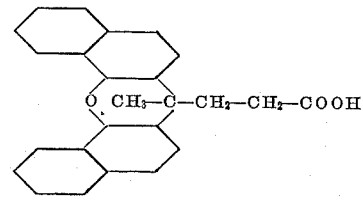

In this case, a molecule of water was lost from the bisphenolic intermediate, with the resulting formation of an ether linkage.

*Analysis.*—Calculated for $C_{25}H_{20}O_3$: C, 81.5; H, 5.4. Found: C, 81.1; H, 5.5.

EXAMPLE IX

The amide of γ,γ-bis(4-hydroxyphenyl)valeric acid was prepared by heating the methyl ester (product of Example IV) with excess ammonia overnight at 100° C. in a pressure vessel. The amide was isolated as a crystalline sold melting at 187–188° C.

*Analysis.*—Calculated for $C_{17}H_{19}O_3N$: N, 4.9. Found: N, 4.4.

EXAMPLE X

The methyl ester of γ,γ-bis(4-hydroxyphenyl)valeric acid was converted to the hydrazide by refluxing it with an excess of hydrazine hydrate for one hour. The water, the liberated alcohol and excess hydrazine were then distilled off leaving the hydrazide of γ,γ-bis(4-hydroxyphenyl)valeric acid which was obtained as a glassy solid softening at about 97° C.

*Analysis.*—Calculated for $C_{17}H_{20}O_3N_2$: C, 68.0; H, 6.7. Found: C, 67.1; H, 6.6.

A number of other phenols including 2,6-dimethylphenol, 2,6-diethylphenol, 2,6-di-t-butylphenol, and o-phenylphenol have been found to react readily with the described oxoacids to give bisphenolic acids. Ortho-chlorophenol is also found to react, although much less readily. These and other phenols may be condensed with keto dicarboxylic acids or esters to form bisphenols having two additional functional groups. The dual carboxylic functionality of these condensation products enables the formation of linear polymers of considerable length. It should be noted, however, that the condensation will proceed with greater facility if the two alkylene chains separating the keto group from the carboxyl or carboalkoxy groups are unequal in length unless they are composed of a considerable number of carbon atoms. Additionally, it is essential that the keto acid or ester and the phenol be mutually soluble in the reaction mixture, and because keto dicarboxylic acids are less soluble than their esters in phenols, it is generally preferred that the keto compound be initially converted to its ester form.

The novel compounds of this invention and products obtained therefrom may be utilized in a variety of ways such as for antioxidants, germicides and fungicides, agricultural chemicals (growth regulators), plasticizers, lubricants, low adhesion backsizes, coupling agents, casting and molding resins and as intermediates in the production of polyfunctional epoxy compounds and internally plasticized phenol-aldehyde resins. The compounds of this invention are also valuable intermediates for the preparation of paper and textile treating materials. The initial condensates with formaldehyde as well as derivatives of the carboxyl function provide points of attachment to the fiber. Halogenation and nitration of products of this invention may be carried out to enhance certain types of activity such as fungicidal, bactericidal, and herbicidal functions.

As would be expected, the bisphenolic acids derived from phenol have different properties than those derived from substituted phenols. For example, γ,γ-bis(4-hydroxyphenyl)valeric acid is much higher melting and more hydrophilic than γ,γ-bis(4-hydroxy-3-methylphenyl)valeric acid.

The bisphenolic carboxylic acid compound obtained from phenol (monohydroxybenzene) and levulinic acid or equivalent oxoacid is readily condensed with aldehydes such as formaldehyde to form highly cross-linked polymeric resinous products. Analogous bisphenolic compounds obtained from phenols having an alkyl substituent in a position ortho to the hydroxyl radical form linear rather than cross-linked polymers by condensation with aldehydes. These linear polymers may then be cross-linked by further reaction at the carboxylic acid radical, e.g. by reaction with a polyalcohol.

The following four examples illustrate reactions of the product acid of Example I prepared from phenol, that is, γ,γ-bis(4-hydroxyphenyl)valeric acid, and the manner in which it and polymers obtained by reacting it with other substances may be cross-linked to infusible, insoluble resins. Some of these cross-linked formaldehyde condensates may be used as cation exchange resins.

EXAMPLE XI

Twenty-five grams of γ,γ-bis(4-hydroxyphenyl)valeric acid, 15 grams of 37% aqueous formaldehyde and 24 ml. acetic acid were mixed together; 4 drops concentrated hydrochloric acid added; and the mixture allowed to stand at room temperature about 2½ days. A sample cured overnight at 120° C. was converted to a dark, hard, glassy, bubble-filled resin. A sample allowed to remain at room temperature until gelation occurred was also cured at 120° C. The hard, brown resin glass was broken up and pieces of 4–10 mesh used for measurement of ion exchange capacity. Using 0.1 N sodium hydroxide the capacity of this resin was found to be 3.9 milli-equivalents/gram.

EXAMPLE XII

An insoluble resin was also obtained by dissolving γ,γ-bis(4-hydroxyphenyl)valeric acid in an excess of aqueous sodium hydroxide and adding to this an excess of aqueous formaldehyde solution, followed by evaporation and curing at 120° C.

EXAMPLE XIII

A highly insoluble polyamide which may be cross-linked to an infusible polymer was prepared by reacting the product of Example I with an equivalent amount of polyethylenimine at an elevated temperature. A small amount of xylene was added to aid reaction by removal of water. After 5 to 6 hours at the reflux temperature, a light amber resinous polyamide was obtained. Subsequent reaction with formaldehyde may be carried out to cross-link this polymer.

EXAMPLE XIV

A polymer which exhibits low adhesion properties toward a pressure sensitive adhesive was prepared by esterifying the product acid of Example I with a long chain alcohol (stearyl alcohol) in the presence of a small amount of xylene as a water carrier. The reaction mixture was heated slowly to 170° C. bath temperature over a period of 5 hours. Volatile matter was distilled off to 150° C. at 1 mm. Hg pressure. The amber waxy product was converted to an insoluble resin by reacting it in acetic acid solution with an excess of aqueous formaldehyde using a trace of hydrochloric acid as a catalyst. The solution was warmed to reflux, then evaporated at elevated temperature to give a hard, insoluble resin having low adhesion properties.

Bisphenolic acids obtained from substituted phenols cannot be cross-linked directly by formaldehyde as can those obtained from unsubstituted phenols as was illustrated in Examples XI and XII. However, they can be rendered cross-linkable through their carboxyl group, that is, by reacting them with a polyfunctional compound as is demonstrated in the following example.

EXAMPLE XV

The γ,γ-bis(4-hydroxy-3-methylphenyl)valeric acid obtained in Example II was reacted with butanediol to obtain a tetraphenolic diester compound which became a hard, infusible, insoluble resin by the action of an aqueous formaldehyde solution in an acidic medium.

A variety of other polyfunctional compounds are also suitable for reaction with the carboxylic acid radical of the bisphenolic acids of this invention to produce cross-linkable resins including other diols such as ethylene glycol, diamines such as 1,3-diaminobutane, and amino alcohols such as N-butylethanolamine.

An especially interesting result is obtained by the action of glycols and polyglycols on the bisphenolic substituted carboxylic acids.

EXAMPLE XVI

γ,γ-Bis(4-hydroxyphenyl)valeric acid was esterified with a block copolymer of polyethylene oxide and polypropylene oxide having an average molecular weight of about 2400, which diol may be represented by the formula

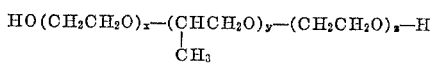

in which x and z are integers equal to 1 or more and y is an integer greater than 1. The diester was cross-linked to a cheesy gel under the action of formaldehyde, as opposed to the hard resin obtained when 1,4-butylene glycol was substituted for the high molecular weight diol. It will be appreciated that resins varying widely in hardness and flexibility are obtainable by proper selection of the diol.

EXAMPLE XVII

New phenoxyacetic acid derivatives may be prepared by condensing the phenolic acids of this invention with chloroacetic acid in the presence of excess aqueous alkali. For example, the following compound

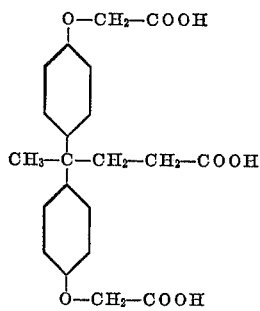

was prepared in such a manner and converted to the sodium salt. It is quite probable that this new compound has a plant hormone-like effect in view of the known activity of other phenoxyacetic acids.

EXAMPLE XVIII

The products of this invention bearing a reactive hydrogen ortho to the phenolic hydroxyl have been found to be useful intermediates in the preparation of photo-sensitive compounds, particularly for use on lithoplates. Thus, γ,γ-bis(4-hydroxyphenyl)valeric acid was esterfied with glycerol to give a product corresponding to a mixture of the mono and diesters. This was nitrosated, reduced to amine, and then diazotized. The diazonium salt was light sensitive and gave a developable image when coated on a properly cleaned aluminum sheet and exposed through a transparency to an arc-lamp light source.

EXAMPLE XIX

A particularly useful application of the compounds of this invention is in the synthesis of a new class of epoxy resins of improved properties. For example γ,γ-bis(4-hydroxyphenyl)valeric acid (the product of Example I) was reacted with N-butylethanolamine to give the amide-ester which in turn was condensed with epichlorhydrin in the presence of excess aqueous alkali. The purified product was isolated as a somewhat soft resin which contained 6.2% oxirane oxygen by analysis.

This was readily cured at an elevated temperature by a variety of curing agents effectively used with epoxy compounds to give a hard polymer having a high heat distortion point. The free acids and monoesters of this invention may also be reacted with epichlorhydrin.

An analogous epoxy derivative was prepared similarly from the product compound of Example II.

A number of other reactions are possible with the novel compounds of this invention to produce a wide variety of novel and useful products. For example, one mol of a dihalogenated compound such as β,β'-dichlorodiethyl ether may be condensed in the presence of excess aqueous alkali with two mols of a bisphenolic substituted carboxylic acid to give a product typified by the following formula, as one example:

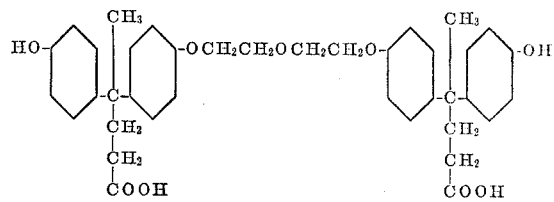

This dicarboxylic acid may be reacted with diols, diamines, diisocyanates, or aminoalcohols to give linear polymers having side group substituents at intervals. Controlled cross-linking can be carried out through the reactive phenolic side group and formaldehyde. This dicarboxylic acid and products obtained therefrom offer considerable promise as plasticizers, antioxidants, and lubricants and may prove to combine two or more of these properties into a single compound. A higher ratio of dihaloether to bisphenolic acid would give polymers directly.

It should also be noted that the aromatic rings of the bisphenolic acids of this invention and compounds obtainable therefrom may be reduced catalytically to give the cycloaliphatic analogs thereof.

I claim:
1. 4,4-bis(4-hydroxyphenyl)pentanoic acid hydrazide.
2. A compound having the structural formula

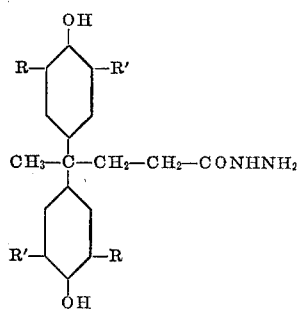

wherein R and R' are each selected from the group consisting of hydrogen and lower alkyl groups.

References Cited in the file of this patent

Beilstein: Handbuch der Organischen Chemie, vol. 10, (4th Ed.), pages 219–220 (1932).

Waler: Journal of the American Chemical Society, vol. 76, page 4002 (1954).

UNITED STATES PATENT OFFICE
CERTIFICATE OF CORRECTION

Patent No. 2,984,685                                              May 16, 1961

Reynold E. Holmen

It is hereby certified that error appears in the above numbered patent requiring correction and that the said Letters Patent should read as corrected below.

In the heading to the printed specification, line 2, title of invention, for "DIPHENOLIC ACID HYDRAZINE" read -- DIPHENOLIC ACID HYDRAZIDE --; column 5, line 67, for "en" read -- an --; column 6, line 51, after "glacial" insert -- acetic --; column 7, line 3, for "sold" read -- solid --; column 9, line 48, for "esterfiied" read -- esterified --.

Signed and sealed this 30th day of January 1962.

(SEAL)
Attest:

ERNEST W. SWIDER                                                  DAVID L. LADD
Attesting Officer                                                          Commissioner of Patents

UNITED STATES PATENT OFFICE
CERTIFICATE OF CORRECTION

Patent No. 2,984,685                      May 16, 1961

Reynold E. Holmen

It is hereby certified that error appears in the above numbered patent requiring correction and that the said Letters Patent should read as corrected below.

In the heading to the printed specification, line 2, title of invention, for "DIPHENOLIC ACID HYDRAZINE" read -- DIPHENOLIC ACID HYDRAZIDE --; column 5, line 67, for "en" read -- an --; column 6, line 51, after "glacial" insert -- acetic --; column 7, line 3, for "sold" read -- solid --; column 9, line 48, for "esterfiied" read -- esterified --.

Signed and sealed this 30th day of January 1962.

(SEAL)
Attest:

ERNEST W. SWIDER                      DAVID L. LADD
Attesting Officer                      Commissioner of Patents